G. P. McDONNELL.
ELECTRICAL SYNCHRONIZER FOR TALKING MOTION PICTURES.
APPLICATION FILED AUG. 11, 1913.
1,184,704.
Patented May 23, 1916.
4 SHEETS—SHEET 1.
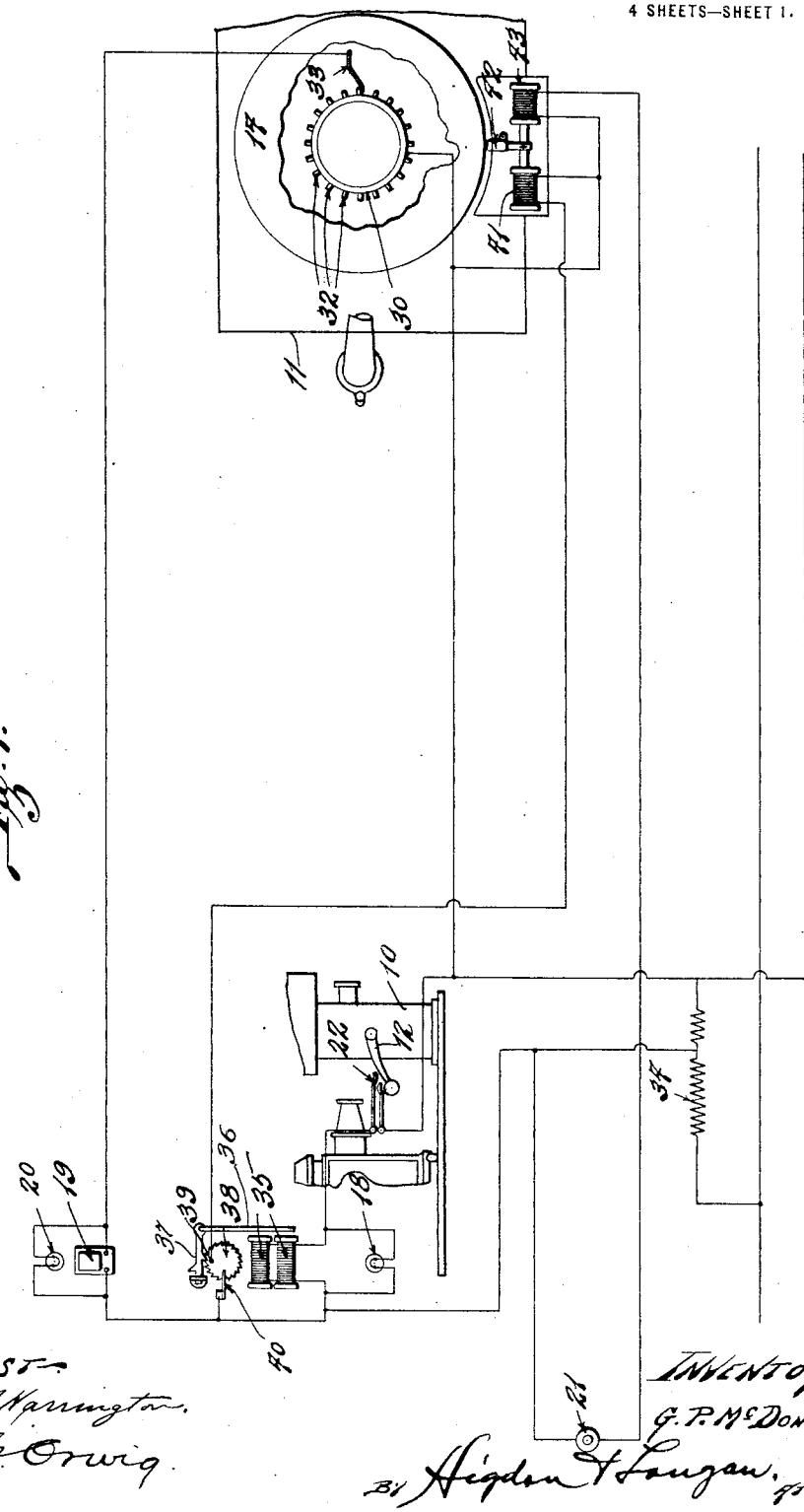

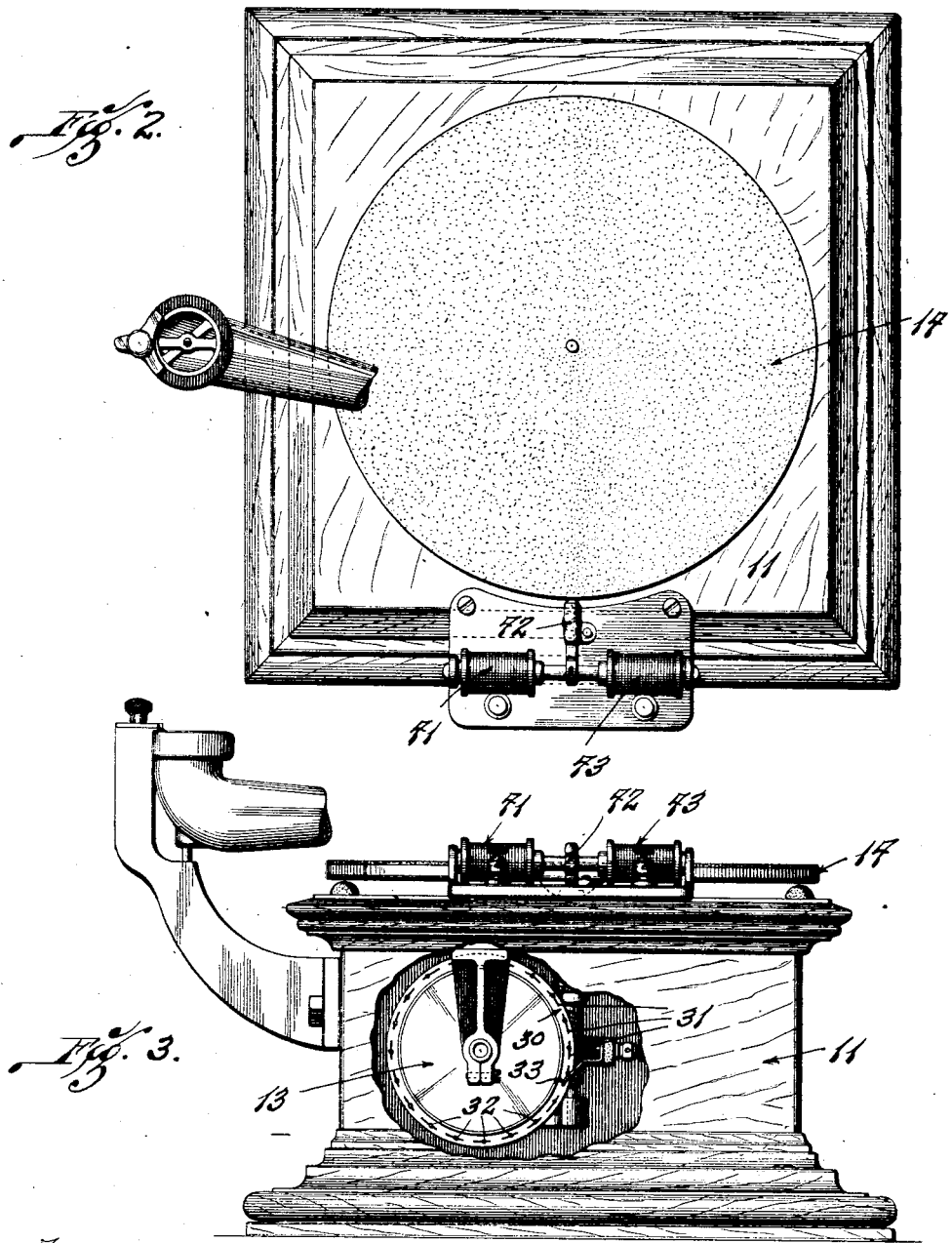

G. P. McDONNELL.
ELECTRICAL SYNCHRONIZER FOR TALKING MOTION PICTURES.
APPLICATION FILED AUG. 11, 1913.
1,184,704.
Patented May 23, 1916.
4 SHEETS—SHEET 3.
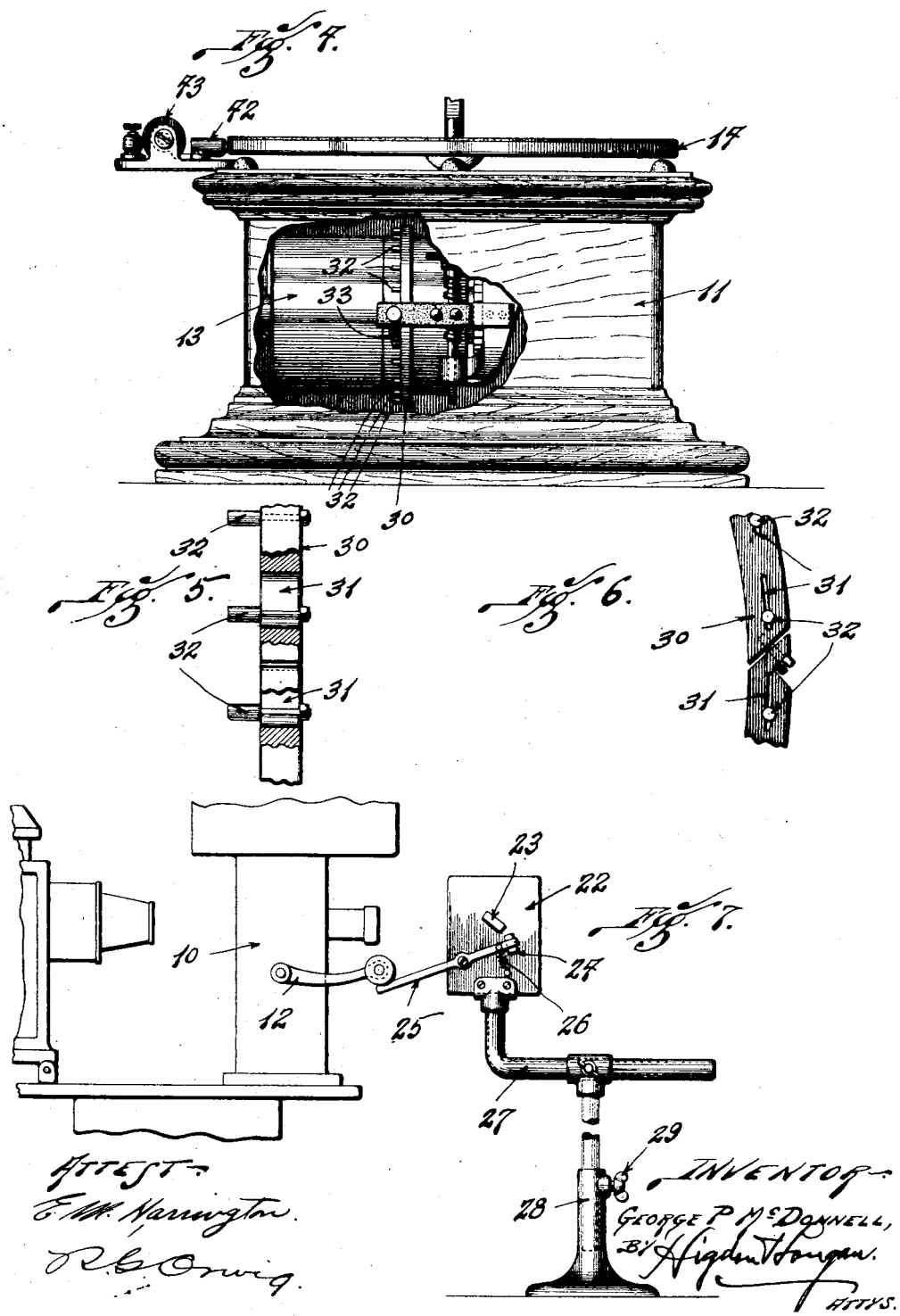

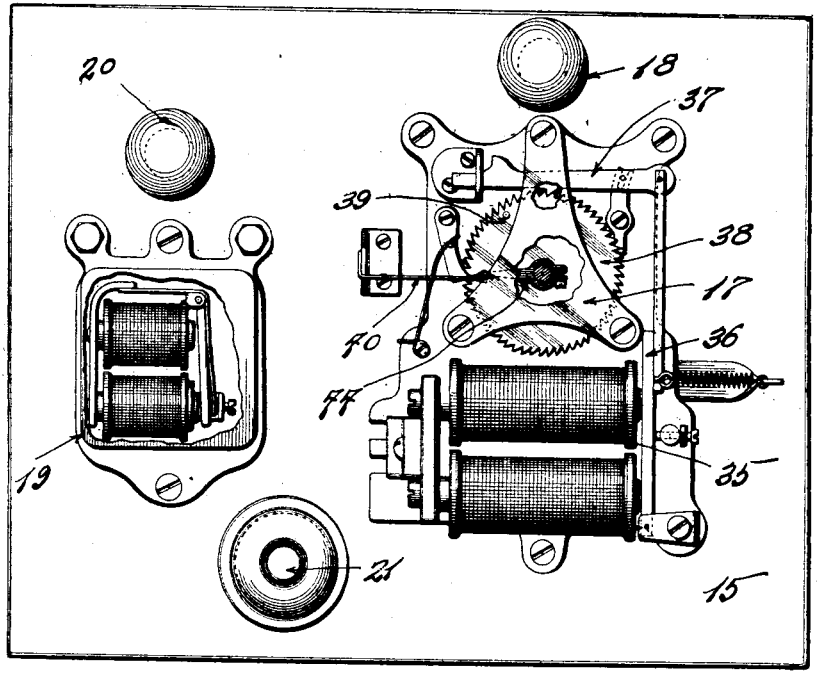
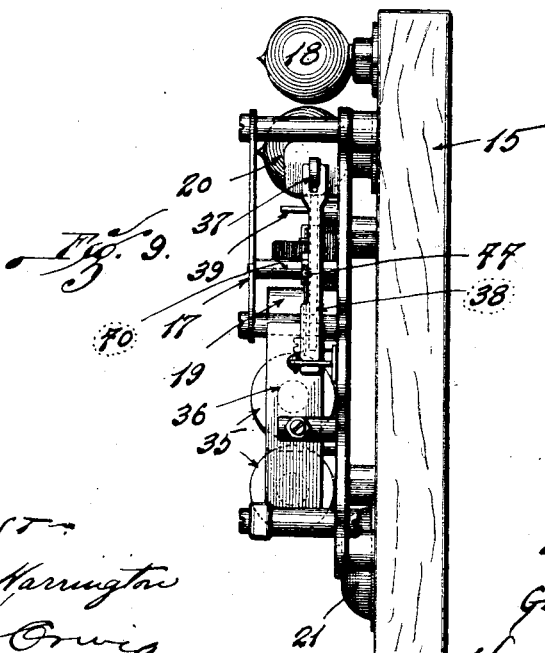

UNITED STATES PATENT OFFICE.

GEORGE P. McDONNELL, OF ST. LOUIS, MISSOURI, ASSIGNOR OF ONE-HALF TO JOHN M. HOCKMUTH, OF ST. LOUIS, MISSOURI.

ELECTRICAL SYNCHRONIZER FOR TALKING MOTION-PICTURES.

1,184,704.  Specification of Letters Patent.  Patented May 23, 1916.

Application filed August 11, 1913. Serial No. 784,237.

*To all whom it may concern:*

Be it known that I, GEORGE P. McDONNELL, a citizen of the United States, and resident of St. Louis, Missouri, have invented certain new and useful Improvements in Electrical Synchronizers for Talking Motion-Pictures, of which the following is a specification containing a full, clear, and exact description, reference being had to the accompanying drawings, forming a part hereof.

My invention relates to an improved electrical synchronizing-mechanism for talking motion-picture machines, and the object of the invention is to produce a higher efficiency in machines of this class.

My invention consists, generally, of the combination with a motion-picture machine and a talking machine, of a suitable electric signaling-device for said motion-picture machine, to indicate its speed; another signaling-device for said talking-machine, to indicate its speed to the operator of said motion-picture machine; said signaling-devices having unequal resistance; a suitable circuit in which said signaling-devices are included in multiple; a suitable circuit maker and breaker actuated by said motion-picture machine, to periodically make and break the circuit on said signaling-device of said motion-picture machine; another circuit maker and breaker actuated by said talking-machine, to periodically make and break the circuit on said talking-machine signaling-device during operation of said talking-machine; a suitable source of electricity (as a main line of high voltage) to which said circuit is connected; and a suitable resistance interposed in said circuit between said signals and the source of electricity, to reduce the voltage of said circuit to such degree that the current delivered thereover will be too weak to actuate both of said signaling-devices simultaneously to any practical degree, but strong enough to operate (or display) periodically during the operation of the machine to which it is connected the signaling-device which has the least resistance, and said current traversing said circuit being also strong enough to alternately operate the signaling-devices of both of said machines, whereby the signals of both machines will be operated alternately when said motion-picture machine and said talking-machine are not in synchronism and only the signaling-device of one of said machines will be operated (or displayed) when said machines are in synchronism.

My invention consists further of the combination with a talking-machine motor, of an annular or ring-like arrangement of electrical-contacts carried by said motor and arranged thereon to be adjusted nearer to or farther from each other, for the purpose of changing the time of contact, as required for use in connection with a motion-picture machine operable at various rates of speed.

My invention consists further in certain additional novel features of construction which will be hereinafter described and specifically designated in the appended claims.

In the drawings, Figure 1 shows in diagram a synchronizing apparatus constructed according to my invention; Fig. 2 is a plan of a phonograph showing my improved starting and stopping device; Fig. 3 is an elevation of a phonograph, partly broken away, illustrating the starting and stopping device and also the variable timing means; Fig. 4 is an elevation of the phonograph taken at right angles to Fig. 3, the side of the box being broken away to show more fully the timing means; Fig. 5 is a fragmental edge elevation partly in section of a ring which is secured to the motor of the phonograph and shows the arrangement of the contact points carried by the ring; Fig. 6 is a fragmental side elevation of the ring shown in Fig. 5, showing the means for connecting the ends of the ring; Fig. 7 shows in elevation a portable and adjustable circuit maker and breaker and its arrangement relative to a motion picture machine; Fig. 8 is a face view of a signal board and illustrates the detail construction of the signal devices; and Fig. 9 is an edge elevation of the structure shown in Fig. 8.

Referring by numerals to the accompanying drawings: 10 designates the motion picture machine and 11 a phonograph which are or may be of any desired construction. The picture machine is of the manually operated type and is provided with the usual crank 12 for its manipulation. The phonograph is of the ordinary type having a spring motor 13 and a rotating record-carrier 14. The type of phonograph shown is that of the disk record class.

I do not wish to be limited to the forms of machines shown, but they embody the essentials to my invention which are a manually controlled motion picture machine and a phonograph operable by a normally energized motor. Arranged adjacent the operator of the motion picture machine or at least within his range of sight and hearing there is a board 15 which carries a common signal device 17 in electrical circuit with a light 18 arranged to be operated by a movement of the motion picture machine, an audible signal device 19 of a well-known construction and a light 20 arranged to be operated upon a movement of the phonograph and also a push-button 21 whose office will be explained hereinafter. Arranged adjacent the motion picture machine is a switch 22 carrying a fixed contact 23 and a movable contact 24, the movable contact being mounted upon a pivoted arm 25 in the path of travel of the crank 12 of the motion picture machine. To normally hold the movable contact removed from the fixed contact there is a contractile coil spring 26.

The switch as a whole is preferably secured to an L-shaped support 27 which is adjustably secured to a standard 28, the standard being provided with a set screw 29 whereby it may be altitudinally adjusted. By this universal adjustability of the switch stand the switch may be placed in an operative position relative to the motion picture machine without changing the position of the motion picture machine.

The switch just described is in circuit with the signal device 17 and the light 18 so that unless influenced, as will be hereinafter more fully explained, by the signal device connected with the phonograph the signal 17 and the light 18 will be operated upon each revolution of the crank 12 of the motion picture machine. Secured to the rotor of the phonograph motor there is a ring 30 provided with a plurality of slots 31 in which are adjustably secured the contact points 32. Secured to a stationary part of the motor 13 is a brush 33 arranged in the path of the contact points 32. The brush 33 and the contact points 32 are in circuit with the signal device 19 and the light 20 and are arranged to produce both an audible and visible signal each time the brush 33 engages a contact point carried by the rotor of the motor.

In order to avoid possible confusion which would exist if both signal apparatuses were simultaneously operated, I arrange the signals in such manner as to cause only the signal connected with the phonograph to operate when the phonograph and picture machine are in synchronism.

It is to be noted here that the signal connected with the motion picture machine is operable only when the two machines are out of synchronism so that the operator, by observing the time of the two signals, may reduce or increase the speed of the manually controlled machine to establish synchronism. For example, if the signal of the phonograph is produced before the signal of the motion picture machine then the operator will speed up the motion picture machine to bring it to the time of the phonograph, or if the signal of the motion picture machine is before the signal of the phonograph then the operator will reduce the speed of the picture machine to bring it to time with the signal of the phonograph.

The means for effecting the operation of only one signal device during synchronism comprises a volt reducer or resistance 34 which is in the line between the signal devices and the service wires and also a difference in the construction of the signal devices themselves which will offer less resistance in the one instrument than in the other, that is, the windings in the coils may vary in the audible signal devices, and the filaments in the lights or visible signals may vary so that the energy measured or determined by the resistance will, upon the establishment of a circuit between the phonograph and its signal device, produce both a visible and audible signal as to the speed or movement of the phonograph. The said resistance 34 is so great as to prevent the passage of any current directly across the wires of the circuit at the point where said resistance is located, thus obviating wastage of current. Said resistance 34 is of common construction, and is preferably not adjustable, as is a rheostat.

The signal device 17 and the light 18 are in the same circuit as the signal devices just described connected with the phonograph. The before mentioned common signal device 17 is of such character as to offer a higher resistance to the energy than does the signal device 19 connected with the phonograph, and the combined resistance of the two or various signal devices, is too great for the voltage of the circuit, thereby making it impossible for both signals to be operated at the same time and causing the selection for operation of the signal connected with the phonograph, which offers the less resistance. By reason of the slots 31 in said ring 30 carrying the contacts 32 in the phonograph the spacing of the contacts may be adjusted, and thereby the timing of the contacts may be varied.

The average speed of a motion picture machine is sixty revolutions per minute or one revolution per second. In such a condition I space apart the contact points 32 so that there will be a contact with the brush at intervals of one second apart, or sixty times per minute. If a certain film requires greater speed of the motion picture machine, these contacts 32 must be moved closer together, or if certain other films are used which require a slower speed the contact points 32 must be moved at wider intervals. In the signal apparatus 17 there is an electromagnet 35 in circuit with the switch 22 so that upon each operation of the switch the magnet is energized. 36 designates an armature which is operable by the said magnet. This armature itself vibrates and makes the usual click which is the audible signal employed in connection with the picture machine. Operable by the armature 36 there is a common detent arm 37 having the usual slot-and-pin detent arranged to engage with a ratchet wheel 38, the teeth of which are spaced apart distances equal to predetermined distances in the film lengths. The said arm 37 serves primarily as a means for moving the said ratchet-wheel 38 forward, and after the same has been so moved it is locked by the said slot-and-pin detent, in the usual manner. For example, we will assume that the spacing of said teeth represents one foot of film. Opposite one of said teeth and connected with the ratchet wheel there is a contact point 39. Secured to the board 15 in the path of the contact point 39 there is a brush 40. The contact point 39 and the brush 40 are in a normally broken circuit with a common core-repelling electro-magnet 41 located in proximity to the phonograph, which magnet operates to release a common frictional stop device 42, pivotally secured to the phonograph and adapted to be swung to engage or disengage the record carrier. By this means I am enabled to take care of the film titles so that the phonograph will not be set in motion until the titles have been "run off."

The push-button 21, previously referred to, is in normally broken circuit with a second electro-magnet 43 arranged adjacent the phonograph. This magnet is also connected with the stop device 42 so that when the film has been wholly exhibited the phonograph may be stopped by the operator touching the button 21. The said stop-device, or brake, 42 is held in release position by the inertia and friction of its parts, and I have found that no other force is necessary for such function.

On various makes of films, the title lengths vary and in order to facilitate the operation of setting the machine to take care of the varying lengths of titles I have provided an indicator 44. This indicator is useful in order that the operator need not be put to the task of counting the number of ratchet teeth with respect to the location of the contact 39 each time a new film is used. If the operator is using one make of film, all of which have a fixed title length, this indicator will readily point to the proper location of the contact 39.

In the practical operation of my machine assuming a film to be placed in position in the picture machine, the contact point 39 moved to a position corresponding with the feet length of the title on the film, a record applied to the phonograph the motor of which has been energized the stop devices set in position to hold the record-carrier against movement, the operator by a movement and the contact points 32 spaced from the brush 33 of the crank 12 of the picture machine sets the picture machine in motion to exhibit its title. At each operation of the crank 12 the switch device 22 is operated. Each time the switch is operated the electro-magnet 35 is energized and through the medium of the armature 36 and the detent 37 the ratchet wheel 38 is moved a distance of one tooth. When the title has been wholly exhibited the contact point 39 carried by the ratchet wheel engages the brush 40 thereby establishing a circuit which energizes the electro-magnet 41 at the phonograph which effects a release of the stop device 42 so that the phonograph is set in motion. At this time, the phonograph being in motion, the contact points 32 in connection with the brush 33 produce a signal which, due to the uniform speed of the phonograph, is maintained at uniform intervals of time. At each revolution of the motion picture machine crank there is formed a contact which will operate the signal device 17 so that the operator has both a visible and audible signal from each instrument which may be instantly compared as to time.

For reasons hereinbefore given if the machines are in synchronism only the signal from the phonograph will be made, and if the machines are out of synchronism one signal will be slightly in advance of the other, so that the operator may, by manipulating the picture machine, bring the machines to synchronism.

I claim:

1. An improved synchronized apparatus for talking motion-picture machines, comprising the combination with a motion picture machine and a talking machine, of an electric signaling-device electrically connected to said motion-picture machine; another electric signaling-device connected to said talking-machine; said two signaling-devices having unequal resistance; a suitable circuit in which both of said signaling devices are included in multiple; a suitable circuit maker and breaker to be actuated by said motion-picture machine in periodically making and breaking the circuit on said signaling device which is connected to said motion-picture machine; another circuit maker and breaker actuated by said talking-machine, to periodically make and break the circuit on its signaling-device during operation of said talking-machine;

a suitable source of electricity to which said circuit is connected; and a suitable resistance interposed in said circuit between said signals and said source of electricity, to reduce the voltage of said circuit to such degree as will prevent the operation of both of said signaling-devices simultaneously to any practical extent, but leaving the voltage of said circuit sufficiently high to operate (or display) periodically during operation of the machine to which it is connected the signaling-device of less resistance, and sufficiently high to alternately operate the signaling-devices of both machines; whereby the signals of both of said machines will be operated alternately when said motion-picture machine and said talking-machine are out of synchronism, and only the signaling-device of one of said machines will be operated or displayed when said machines are operating in synchronism.

2. In combination with a motor driven phonograph and a manually controlled motion picture machine, a synchronizing apparatus comprising a signal device electrically connected in circuit with each of said machines, and the said signal-devices having unequal resistance, means for causing the motor driven phonograph to intermittently operate the signal device associated therewith at intervals proportionate to its movement, means for causing the manually controlled motion picture machine to intermittently operate the signal device associated therewith at intervals proportionate to its movement, and a resistance in said circuit for causing only the less resistance signal device associated with the motor driven phonograph to be operated when the two signal device operating means are simultaneously actuated by the two machines.

3. In combination with a phonograph having the usual motor for driving the same, a motion picture machine, a signal device for said phonograph, a signal device for said motion picture machine, and means substantially as described at said phonograph and said motion picture machine for effecting the operation of said signal devices at intervals proportionate to their speeds, the said means at the phonograph being a contact-carrying ring having a series of slots and mounted on the periphery of said phonograph motor, and a series of contacts which are adjustably mounted in said slots on the said ring, for the purpose of relatively timing the said signal devices of said phonograph and the said motion picture machine.

4. In a synchronized apparatus for talking motion picture machines, a manually-controlled motion picture machine, a phonograph having the usual motor, a stop-device for controlling the motor of said phonograph, an electric signal for said motion picture machine, an electric signal for said phonograph, an electric circuit whose strength of current is too low to simultaneously operate the signals of both picture machine and phonograph, but which current is strong enough to operate through the resistance of said signals one at a time, and said circuit being common to both signals and to both picture machine and phonograph, the resistances of the said signals being unequal, and circuit making and breaking devices at said picture machine and at said phonograph, the signal of said motion picture machine comprising a toothed element carrying a contact which is in the said circuit, whereby a given film length may be moved prior to the release of the said phonograph stop-device.

In testimony whereof, I have signed my name to this specification, in presence of two subscribing witnesses.

GEORGE P. McDONNELL.

Witnesses:
E. L. WALLACE,
N. G. BUTLER.

Copies of this patent may be obtained for five cents each, by addressing the "Commissioner of Patents, Washington, D. C."